(12) United States Patent
Lee (10) Patent No.: US 12,126,026 B2
(45) Date of Patent: Oct. 22, 2024

(54) ELECTRODE CURRENT COLLECTOR COMPRISING RESISTIVE LAYER BETWEEN TWO OR MORE METAL FOILS, ELECTRODE COMPRISING THE SAME, AND LITHIUM SECONDARY BATTERY

(71) Applicant: LG CHEM, LTD., Seoul (KR)

(72) Inventor: Hanyoung Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 789 days.

(21) Appl. No.: 17/269,440

(22) PCT Filed: Jul. 24, 2020

(86) PCT No.: PCT/KR2020/009773
§ 371 (c)(1),
(2) Date: Feb. 18, 2021

(87) PCT Pub. No.: WO2021/054595
PCT Pub. Date: Mar. 25, 2021

(65) Prior Publication Data
US 2021/0384514 A1    Dec. 9, 2021

(30) Foreign Application Priority Data

Sep. 19, 2019   (KR) .................. 10-2019-0115355

(51) Int. Cl.
*H01M 4/66*      (2006.01)
*H01M 10/0525*   (2010.01)

(52) U.S. Cl.
CPC .......... *H01M 4/661* (2013.01); *H01M 4/663* (2013.01); *H01M 4/668* (2013.01); *H01M 10/0525* (2013.01)

(58) Field of Classification Search
CPC ..... B32B 15/082; B32B 15/085; B32B 15/18; B32B 15/20; B32B 2250/03;
(Continued)

(56) References Cited

U.S. PATENT DOCUMENTS 9,005,807 B2   4/2015   Honda
9,825,302 B1   11/2017  Shin et al.
(Continued)

FOREIGN PATENT DOCUMENTS

CN   102856558 A   1/2013
CN   102891323 A   1/2013
(Continued)

OTHER PUBLICATIONS

Machine translation JP2014167849A (Year: 2014).*
(Continued)

*Primary Examiner* — Victoria H Lynch
(74) *Attorney, Agent, or Firm* — MORGAN, LEWIS & BOCKIUS LLP (57) ABSTRACT

The present disclosure provides an electrode current collector for a lithium secondary battery, the electrode current collector comprising: two or more metal foil layers, and a resistive layer positioned between the two or more metal foil layers, wherein the resistive layer includes a volume expandable resin, a conductive material, and an adhesive, an electrode comprising the same, and a lithium secondary battery.

18 Claims, 8 Drawing Sheets

(58) Field of Classification Search
CPC ............ B32B 2250/40; B32B 2250/42; B32B 2262/103; B32B 2262/106; B32B 2264/102; B32B 2264/105; B32B 2264/107; B32B 2264/108; B32B 2307/732; B32B 2457/10; B32B 27/20; B32B 27/306; B32B 27/32; B32B 3/30; B32B 9/007; B32B 9/045; H01M 10/0525; H01M 10/4235; H01M 2200/10; H01M 4/661; H01M 4/663; H01M 4/667; H01M 4/668; Y02E 60/10
See application file for complete search history.

(56) References Cited

U.S. PATENT DOCUMENTS

| | | | |
|---|---|---|---|
| 2012/0052378 | A1 | 3/2012 | Torata et al. |
| 2013/0177787 | A1 | 7/2013 | Arima et al. |
| 2015/0340699 | A1 | 11/2015 | Chami et al. |
| 2016/0284435 | A1 | 9/2016 | Abe et al. |
| 2016/0322641 | A1 | 11/2016 | Saito et al. |
| 2018/0342736 | A1 | 11/2018 | Matsushita et al. |
| 2020/0295362 | A1 | 9/2020 | Lee et al. |

FOREIGN PATENT DOCUMENTS

| | | | |
|---|---|---|---|
| CN | 108682790 | A | 10/2018 |
| CN | 109216703 | A | 1/2019 |
| CN | 110114914 | A | 8/2019 |
| JP | 2009-059571 | A | 3/2009 |
| JP | 4967267 | B2 | 7/2012 |
| JP | 2014167849 | A * | 9/2014 ........... B32B 15/088 |
| JP | 2015-165535 | A | 9/2015 |
| JP | 2018-092804 | A | 6/2018 |
| JP | 2018-200784 | A | 12/2018 |
| JP | 2019-071208 | A | 5/2019 |
| KP | 2013-251421 | A | 12/2013 |
| KR | 10-2006-0062005 | A | 6/2006 |
| KR | 10-2008-0036261 | A | 4/2008 |
| KR | 10-2013-0090160 | A | 8/2013 |
| KR | 10-1408389 | B1 | 6/2014 |
| KR | 10-2015-0032268 | A | 3/2015 |
| KR | 10-2015-0087372 | A | 7/2015 |
| KR | 10-2017-0021487 | A | 2/2017 |
| KR | 10-2017-0095604 | A | 8/2017 |
| KR | 10-2019-0012840 | A | 2/2019 |
| WO | 2014132679 | A1 | 9/2014 |

OTHER PUBLICATIONS

Machine translation JP2019071208A (Year: 2019).*
Office Action dated Sep. 16, 2023, issued in corresponding Chinese Patent Application No. 202080004372.5.
International Search Report and Written Opinion dated Oct. 30, 2020, issued in corresponding International Patent Application No. PCT/KR2020/009773.
Extended European Search Report issued by the European Patent Office dated Jul. 20, 2021 in a corresponding European Patent Application No. 20848785.0.

* cited by examiner

ELECTRODE CURRENT COLLECTOR COMPRISING RESISTIVE LAYER BETWEEN TWO OR MORE METAL FOILS, ELECTRODE COMPRISING THE SAME, AND LITHIUM SECONDARY BATTERY

CROSS-CITATION WITH RELATED APPLICATION(S)

Technical Field

This application claims the benefit of Korean Patent Application No. 10-2019-0115355 filed on Sep. 19, 2019 with the Korean Intellectual Property Office, the disclosure of which is incorporated herein by reference in its entirety.

The present disclosure relates to an electrode current collector comprising a resistive layer between two or more metal foils, an electrode comprising the same, and a lithium secondary battery.

Background Art

Recently, along with the increase of the technological development and demand for a mobile device, demand for a secondary battery capable of charging and discharging as an energy source rapidly increases, and accordingly, many researches of the battery capable of meeting a variety of needs are emerging. Further, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Therefore, an electric vehicle (EV), which is driven only by a secondary battery, and a hybrid electric vehicle (HEV), which combines a conventional engine with a secondary battery, have been developed and some thereof have been commercialized. A nickel-metal hydride (Ni-MH) secondary battery has been mainly used as the power source of EV and HEV. Recently, however, studies using lithium secondary batteries having high energy density, high discharge voltage and output stability have been actively conducted, and some thereof have been commercialized.

Such a lithium secondary battery is manufactured by a process in which an electrode slurry containing an electrode active material is applied to an electrode current collector, dried, and rolled to produce an electrode, and an electrode assembly in which a separator is interposed between these electrodes is built in a battery case together with an electrolyte.

Here, since the electrode current collector serves to receive electrons from an active material and transfer them to the other electrode, if the electrode current collector has excellent electron conductivity, the output characteristics of the lithium secondary battery including the same are improved.

In addition, recently, the use of lithium secondary batteries has been expanding and they are being used in electric vehicles and the like, and therefore, research is actively underway to improve the output characteristics.

Among them, the technology for improving output characteristics by increasing the thickness of the electrode current collector has been developed, but as the electrode current collector is thicker, a larger amount of current can flow. Thus, it acts as a factor that reduces safety under non-ideal charging conditions, which is an obstacle to the research.

Accordingly, there is a high need for a technology capable of solving the above problems and preventing deterioration of safety while improving output characteristics, by forming an electrode current collector to be thicker.

DETAILED DESCRIPTION OF THE INVENTION

Technical Problem

The present disclosure has been directed to solve the above-mentioned problems of the prior arts and other technical problems that have yet to be resolved.

Specifically, it is an object of the present disclosure to provide an electrode current collector capable of maintaining a large thickness to improve output characteristics and also improving the safety of a secondary battery including the same.

Technical Solution

In order to achieve the above object, according to an embodiment of the present disclosure, there is provided an electrode current collector for a lithium secondary battery, the electrode current collector comprising: two or more metal foil layers, and a resistive layer positioned between the two or more metal foil layers, wherein the resistive layer includes a volume expandable resin, a conductive material, and an adhesive.

In one embodiment, the resistive layer may be interposed between two or more flat metal foil layers.

For example, the electrode current collector may be configured to include a lower current collector, a first resistive layer located on the lower current collector, an intermediate current collector located on the first resistive layer, a second resistive layer located on the intermediate current collector, and an upper current collector located on the second resistive layer.

In another embodiment, at least one metal foil layer of the two or more metal foil layers has a concavo-convex portion including a convex portion and a concave portion on the surface thereof, and the resistive layer may be formed in the concave portion.

At this time, the convex portion and the concave portion may be formed at regular intervals.

Meanwhile, the volume expandable resin contained in the resistive layer may be at least one selected from the group consisting of polyethylene, polypropylene, and polyethylene vinyl acetate.

The volume expandable resin contained in the resistive layer may block a current between two metal foil layers adjacent to each other if the temperature rises due to non-ideal conditions.

The conductive material may be at least one selected from the group consisting of carbon-based materials and metal materials.

The adhesive may be at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber and a fluorine rubber.

Meanwhile, the resistive layer may have a thickness of 5 to 50 μm.

The two or more metal foil layers may be made of mutually identical metals.

The two or more metal foil layers may have a thickness of 10 to 100 μm, respectively.

The two or more metal foil layers may be made of Al metal, and the electrode current collector may be a positive electrode current collector.

Meanwhile, according to another embodiment of the present disclosure, there are provided an electrode in which an electrode mixture containing an electrode active material, a binder and a conductive material is formed on at least one surface of the electrode current collector, and a lithium secondary battery including the same.

DETAILED DESCRIPTION OF THE EMBODIMENTS

According to the present disclosure, there is provided an electrode current collector for a lithium secondary battery, the electrode current collector comprising: two or more metal foil layers, and a resistive layer positioned between the two or more metal foils, wherein the resistive layer includes a volume expandable resin, a conductive material, and an adhesive.

The electrode current collector is not limited as long as it has a structure including a resistive layer between the two or more metal foil layers, and various structures are possible.

As one example, the resistive layer may be interposed between two or more flat metal foil layers. In other words, it may be a shape interposing as one layer between two or more metal foil layers.

Specifically, this is a structure in which a resistive layer is interposed as one layer between two metal foil layers, and may be composed of a lower current collector, a resistive layer located on the lower current collector, and an upper current collector located on the resistive layer.

Here, and hereinafter, these are terms for dividing the structure including the lower current collector, the upper current collector, the intermediate current collector, etc., and correspond to the metal foil layer.

Figure 1:
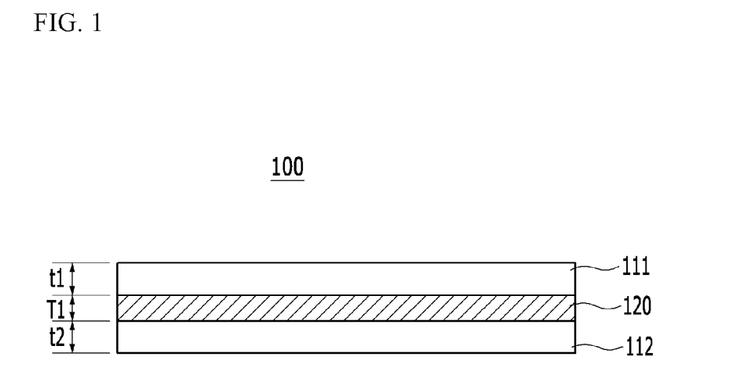
FIG. 1 is a vertical cross-sectional view of an electrode current collector according to an embodiment of the present disclosure.

FIG. 1 schematically shows a vertical cross-sectional view of such an electrode current collector.

Referring to FIG. 1, the electrode current collector 100 according to the present disclosure has a structure in which a resistive layer 120 is interposed between two metal foil layers 111 and 112.

Specifically, the electrode current collector is composed of a lower current collector 112, a resistive layer 120 located on the lower current collector 112, and an upper current collector 111 located on the resistive layer 120.

Alternatively, the electrode current collector may have a structure in which the metal foil layers are three or more, the resistive layers are two or more, and the resistive layers are interposed between the metal foil layers.

Figure 2:
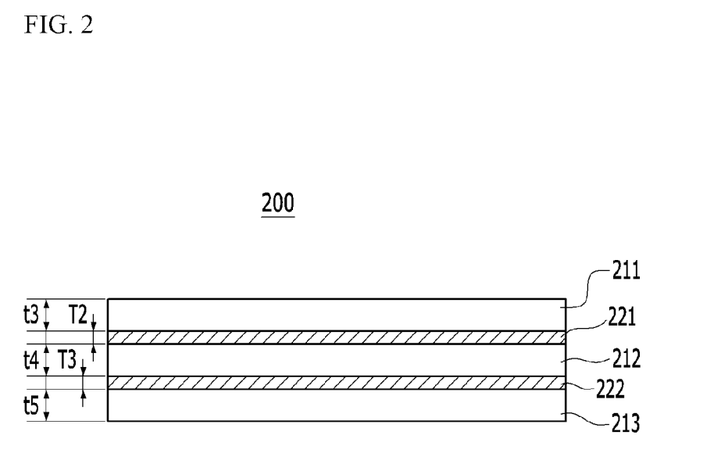
FIG. 2 is a vertical cross-sectional view of an electrode current collector according to another embodiment of the present disclosure.

FIG. 2 schematically shows a vertical cross-sectional view of the electrode current collector.

Referring to FIG. 2, the electrode current collector 200 according to the present disclosure is composed of a structure including a lower current collector 213, a first resistive layer 222 located on the lower current collector 213, an intermediate current collector 212 located on the first resistive layer 222, a second resistive layer 221 located on the intermediate current collector 212, and an upper current collector 211 located on the second resistive layer 221.

As another example, at least one metal foil layer of the two or more metal foil layers may have a concavo-convex portion including a convex portion and a concave portion on the surface thereof, and the resistive layer may be formed in the concave portion.

Specifically, the electrode current collector may be a structure having a concavo-convex portion including a convex portion and a concave portion on one surface of the metal foil layers facing each other, wherein the resistive layer is formed in the concave portion.

Figure 3:
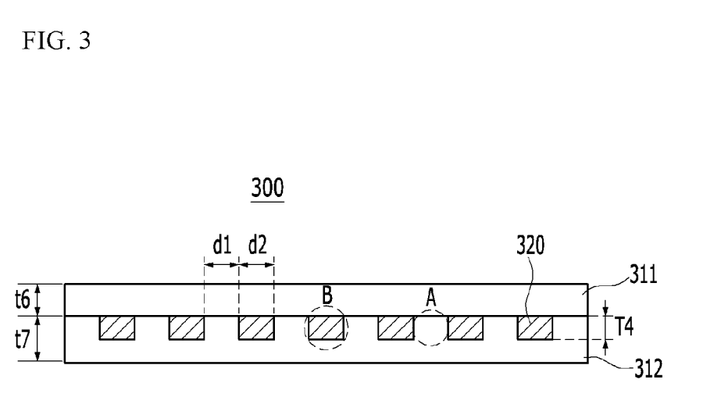
FIG. 3 is a vertical cross-sectional view of an electrode current collector according to another embodiment of the present disclosure.

In order to show such a structure, a vertical cross-sectional view of such electrode current collector is schematically shown in FIG. 3.

Referring to FIG. 3, the electrode current collector 300 according to the present disclosure includes an upper current collector 311, a lower current collector 312, and a resistive layer 320 positioned between the upper current collector 311 and the lower current collector 312.

At this time, the lower current collector 312 has a concave-convex portion including a convex portion A and a concave portion B on the surface, wherein the resistive layer 320 is formed in the concave portion B.

Alternatively, the electrode current collector may be a structure having a concavo-convex portion including a convex portion and a concave portion on the surface of both the metal foil layers facing each other, wherein the resistive layer is formed in the concave portion.

Figure 4:
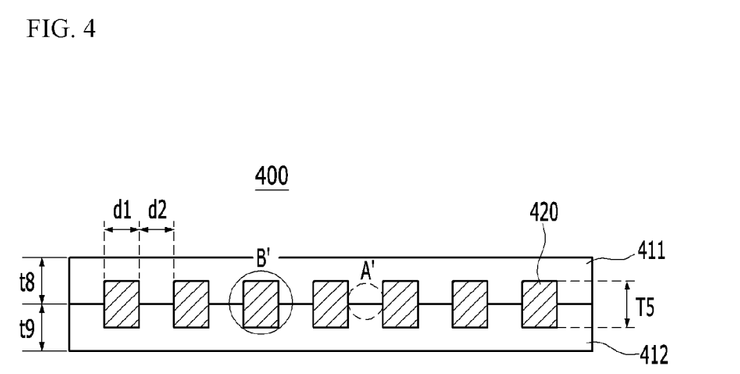
FIG. 4 is a vertical cross-sectional view of an electrode current collector according to yet another embodiment of the present disclosure.

FIG. 4 schematically shows a vertical cross-sectional view of the electrode current collector.

Referring to FIG. 4, the electrode current collector 400 according to the present disclosure has a structure having a concavo-convex portion including a convex portion A' and a concave portion B' on the surfaces of the upper current collector 411 and the lower current collector 412, wherein the convex portions A' face each other, the concave portions B' face each other, and a resistive layer 420 is formed in the concave portions B' facing each other.

Meanwhile, although not shown in the figures, the convex portion of the upper current collector, and the concave portion of the lower current collector may face each other. In this case, a resistive layer may be formed in respective concave portions.

In the case of a metal foil layer which the convex portion and the concave portion are formed as shown in FIGS. 3 and 4, the convex portions A and A' and the concave portions B and B' may be formed at regular intervals d1=d2. Of course, the interval is not limited thereto as long as it is a case including a resistive layer in a sufficient level to exhibit the effect according to the present disclosure, and the interval may be appropriately selected. For example, the intervals d1 and d2 may be 100 μm to 200 μm respectively.

Meanwhile, when the concave portion and the convex portion are formed in this way, the planar shape of the concave portion is not limited, and may be a linear shape, a circular shape, or a polygonal shape.

Figure 5:
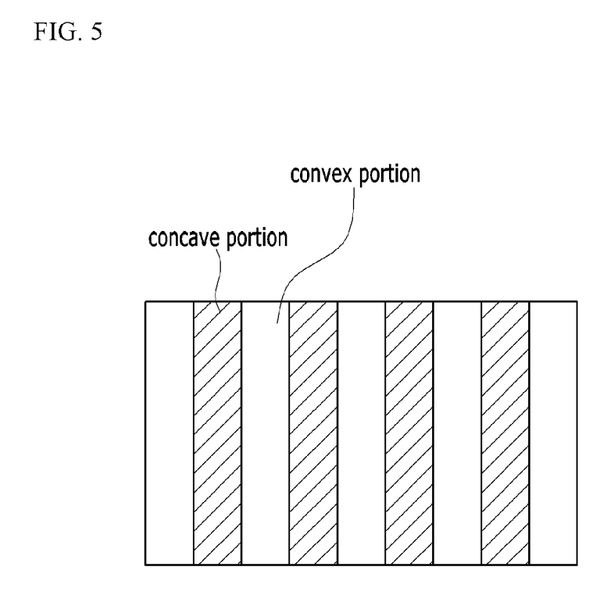
FIG. 5 is a plan view of an electrode current collector according to yet another embodiment of the present disclosure.
Figure 6:
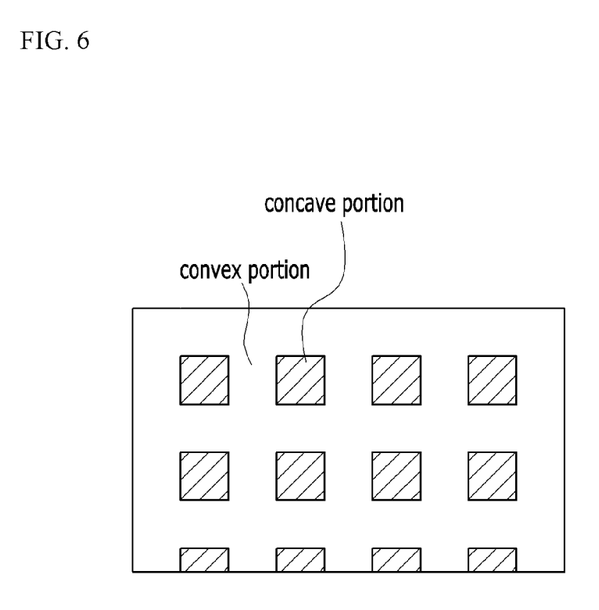
FIG. 6 is a plan view of an electrode current collector according to further embodiment of the present disclosure.
Figure 7:
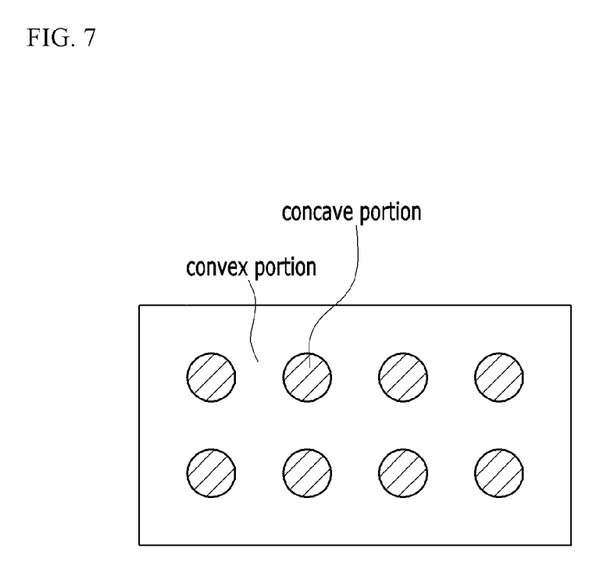
FIG. 7 is a plan view of an electrode current collector according to further embodiment of the present disclosure.

In order to show these examples, FIGS. 5 to 7 show plan views of metal foils having a concave portion and a convex portion.

FIG. 5 shows a case where the planar shape of the concave portion is linear, FIG. 6 shows a case where the planar shape of the concave portion is square, and FIG. 7 shows a case where the planar shape of the concave portion is circle. In the case like FIG. 7, the vertical cross-sectional shape can be a semicircle unlike in FIGS. 3 to 4

In the case of having a concave portion and a convex portion and forming a resistive layer in the concave portion in this way, the entire volume of the current collector due to the interposition of the resistive layer can be reduced, and the respective metal foil layers may also be in direct contact with each other. Thus, it has an advantage that conductivity can be sufficiently secured like the existing single current collector under normal operating conditions, and thus can prevent deterioration in energy density and output characteristics compared to the volume of a secondary battery including the same.

Meanwhile, regardless of any structure, the two or more metal foil layers are not limited in terms of the material, but copper, stainless steel, aluminum, nickel, titanium, sintered carbon, or copper; stainless steel treated with carbon, nickel, titanium, silver on the surface thereof; aluminum-cadmium alloy, or the like can be used.

The two or more metal foil layers may be selected and used among the above materials, and may be formed of the same or different metals from each other. However, considering that the resistance is increased or the same active material is used on both sides, the metal foil layers may be made of mutually identical metals.

Further, referring back to FIGS. 1 to 4, the thicknesses $t_1$, $t_2$, $t_3$, $t_4$, $t_5$, $t_6$, $t_7$, $t_8$ and $t_9$ of the metal foil layers 111, 112, 211, 212, 213, 311, 312, 411 and 412 may be 10 to 100 μm respectively.

When the thickness of each of the metal foil layers is too thin outside the above range, output characteristics are reduced, and when the thickness is too thick, it cannot effectively prevent safety problems appearing as the existing electrode current collector becomes thicker, even if there is a resistive layer, which is not preferable.

Further, the shape of the metal foil layer can increase the binding force of the active material by forming a fine concavo-convex on the surface thereof, and various shapes such as a film, a sheet, a foil, a net, a porous body, a foam body and a non-woven fabric can be used.

Meanwhile, the thicknesses $T_1$, $T_2$, $T_3$, $T_4$, and $T_5$ of the resistive layers 120, 221, 222, 320 and 420 may be 5 to 50 μm respectively.

When the thickness is too thin outside the above range, it may not act as a resistive layer. When the thickness is too thick, rather, it may act as a resistive layer even during normal operation to reduce electronic conductivity, resulting in an increase in overall volume and a reduction in an energy density per volume, which is not preferable.

Figure 8:
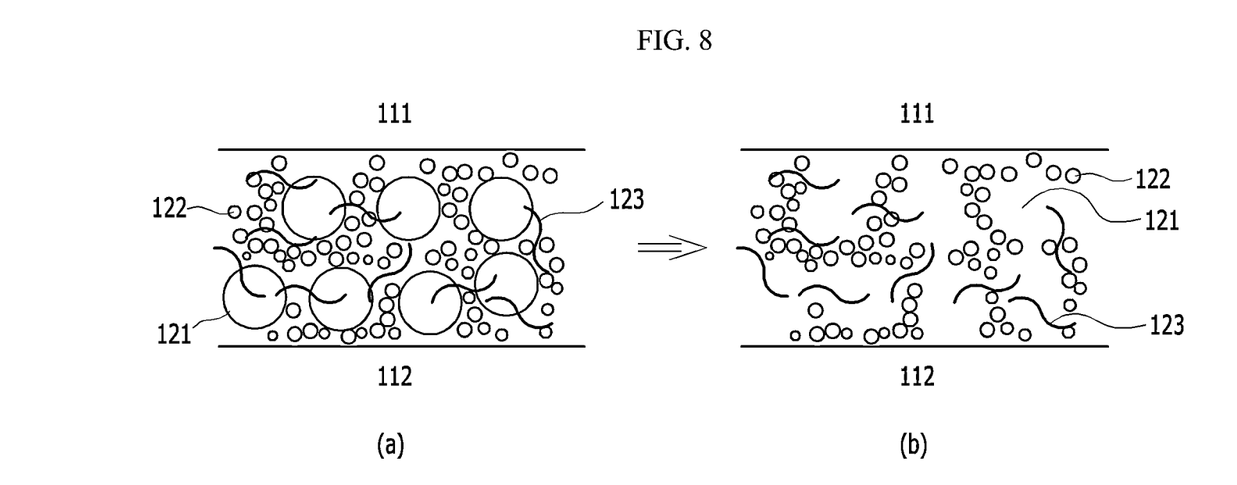
FIG. 8 is a schematic diagram of a shape change due to the temperature of the resistive layer in the electrode current collector of the present disclosure.

Meanwhile, FIG. 8 shows an enlarged schematic diagram to illustrate the configuration of the resistive layer and the form in which the resistive layer operates. As an example, description will be given together with FIG. 1.

Referring to FIG. 8 together with FIG. 1, the resistive layer may specifically include a volume expandable resin 121, a conductive material 122, and an adhesive 123.

Specifically, the volume expandable resin 121 is melted and expanded in volume as the temperature increases, and is not limited as long as it is a material that does not cause a side reaction with the electrolyte. Specifically, it may be at least one selected from the group consisting of polyethylene, polypropylene, and polyethylene vinyl acetate.

At this time, the volume expandable resin 121 may be included in an amount of 20 to 50% by weight based on the total weight of the resistive layer.

When the volume expandable resin is included in a too small amount outside the above range, it cannot sufficiently exert safety during abnormal conditions, and when the volume expandable resin is included in a too large amount, it is difficult to secure conductivity by connecting a conductive material under normal operating conditions of the secondary battery, which is not preferable.

Here, the volume expandable resin 121 may act as a resistor under abnormal conditions later.

Specifically, as schematically shown in FIG. 8, the volume expandable resin 121 exists as a specific type of particles under normal operation of the secondary battery (FIG. 8(a)), and so the conductive material 122 can achieve a conductive path, whereas if the battery temperature rises above a predetermined temperature due to an abnormal condition (FIG. 8(b)), it expands while melting and breaks a conductive path of the conductive material 122 to increase resistance, thereby securing the safety of the battery. That is, the volume expandable resin 121 contained in the resistive layer 120 expands when the temperature increases due to an abnormal condition, thereby reducing or blocking the electric current between two adjacent metal foils 111 and 112.

The conductive material 122 plays a role in maintaining conductivity on both sides of each other while being interposed between two or more metal foil layers.

The conductive material 122 is a material that can be used in a general lithium secondary battery, and is not particularly limited as long as a corresponding battery has conductivity without causing a chemical change, and for example, carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used. Specific examples may be at least one selected from the group consisting of carbon-based materials and metal materials.

The conductive material may be included in an amount of 5 to 40% by weight based on the total weight of the resistive layer.

When the conductive material is included in a too small amount outside the above range, sufficient conductivity in the resistive layer cannot be secured, and when the conductive material is included in a too large amount, conductivity can be maintained even in non-ideal operating conditions, which is not preferable.

Meanwhile, the resistive layer 120 must also perform a role of bonding two or more metal foil layers, and thus also includes an adhesive.

The adhesive 123 forms the binding between the metal foil and the resistive layer, and also assists in the binding between the conductive material and the volume expandable resins.

Such adhesive 123 is not limited as long as it is a component that has an adhesive property and does not induce a chemical change in the battery. Examples thereof may be at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber and a fluorine rubber.

The adhesive may be included in an amount of 5 to 40% by weight based on the total weight of the resistive layer.

When the adhesive is included in a too small amount outside the above range, the adhesive force between the resistive layer and the metal foil cannot be secured, and when the adhesive is included in a too large amount, the content of other materials decreases and the resistance may increase, which is not preferable.

With such a structure, the overall thickness of the electrode current collector can be increased. Thus, in a normal operating condition of the secondary battery including the same, the conductivity between the metal foils is maintained by the conductive material of the resistive layer, and it can exhibit output characteristics similar to the metal foil with a combined thickness of two or more metal foils, and also in abnormal conditions, the temperature rise causes the volume expansion resin to melt and expand, thus destroying a conductive network in conductive materials. Thus, the resistance is increased, and safety can be improved by terminating early voltage during overcharging or by reducing current under excessive C-rate conditions.

Meanwhile, since the electrons are transferred from the positive electrode to the negative electrode, two or more metal foils may be made of Al metal.

Of course, the electrode current collector according to the present disclosure may be a negative electrode current collector, and the two or more metal foils may be made of Cu metal.

The present disclosure further provides an electrode in which an electrode mixture containing an electrode active material, a binder, and a conductive material is formed on at least one surface of the electrode current collector, and a lithium secondary battery including the same.

The electrode current collector has a structure as described above, and the electrode may be a positive electrode and a negative electrode.

When the electrode is a positive electrode, the electrode current collector may be a positive electrode current collector, and may have a structure in which a positive electrode mixture containing a positive electrode active material, a binder, and a conductive material is formed on at least one surface of the positive electrode current collector.

The positive electrode active material may be, for example, a layered compound such as lithium cobalt oxide ($LiCoO_2$) or lithium nickel oxide ($LiNiO_2$) or a compound substituted with one or more transition metals; lithium manganese oxides such as chemical formula $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiV_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formula $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO_4)_3$, and the like, but is not limited thereto.

The binder is not limited as long as it is a component that assists in the binding between the active material and the conductive material and in the binding with the current collector. For example, the binder may be selected from polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber, a fluorine rubber, various copolymers, and the like.

The conductive material is not particularly limited as long as a corresponding battery has conductivity without causing a chemical change in a conventional battery, and for example, carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

At this time, the conductive material and the binder may be, respectively, contained in an amount of 0.1 to 30% by weight, specifically, 0.5 to 10% by weight, more specifically, 1 to 5% by weight based on the total weight of the positive electrode mixture.

When the electrode is a negative electrode, the electrode current collector may be a negative electrode current collector, and may be a structure in which a negative electrode mixture containing a negative electrode active material, a binder, and a conductive material is formed on at least one surface of the negative electrode current collector.

The negative electrode active material may include one or more carbon-based materials selected from the group consisting of artificial crystalline graphite, natural crystalline graphite, amorphous hard carbon, low-crystalline soft carbon, carbon black, acetylene black, ketjen black, Super-P, graphene and fibrous carbon, Si-based materials, metal composite oxides such as $Li_xFe_2O_3 (0 \leq x \leq 1)$, $Li_xWO_2$ ($0 \leq x \leq 1$), $Sn_xMe_{1-x}Me'_yO_z$(Me: Mn, Fe, Pb, Ge; Me': Al, B, P, Si, Group 1, 2, 3 elements in the periodic table, halogen; $0<x \leq 1$; $1 \leq y \leq 3$; $1 \leq z \leq 8$), lithium metals; lithium alloys; silicon-based alloys; tin-based alloys; metal-based oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni based materials; titanium oxide; lithium titanium oxide, and the like, but are not limited thereto.

The details of the conductive material and the binder are the same as described with respect to the positive electrode.

Furthermore, the electrode mixture may optionally further include a filler or the like.

The filler is optionally used as a component for suppressing expansion of a positive electrode, and is not particularly limited as long as the filler is a fibrous material without causing a chemical change in the battery. For example, olefinic polymers such as polyethylene and polypropylene, and fibrous materials such as glass fibers and carbon fibers are used.

Meanwhile, as the separator interposed between the positive electrode and the negative electrode, an insulating thin film having high ion permeability and mechanical strength is used. A pore diameter of the separator is generally 0.01 to 10 μm and a thickness thereof is generally 5 to 300 μm. Olefin-based polymers such as polypropylene, which is chemically resistant and hydrophobic; a sheet or a non-woven fabric made of glass fiber, polyethylene or the like may be used as an example of the separator. When a solid electrolyte such as a polymer is used as the electrolyte, the solid electrolyte may also serve as a separator.

The non-aqueous electrolyte containing a lithium salt may include a non-aqueous electrolyte and a lithium salt.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is readily soluble in the above-mentioned non-aqueous electrolyte. The lithium salt may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

If necessary, an organic solid electrolyte, an inorganic solid electrolyte, or the like may be used.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium (Li) such as $Li_3N$, $LiI$, $Li_5NI_2$, $Li_3N-LiI-LiOH$, $LiSiO_4$, $LiSiO_4-LiI-LiOH$, $Li_2SiS_3$, $Li_4SiO_4$, $Li_4SiO_4-LiI-LiOH$, $Li_3PO_4-Li_2S-SiS_2$.

In addition, for the purpose of improving charge and discharge characteristics, flame retardancy and the like, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the non-aqueous electrolyte. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas.

The lithium secondary battery can be included as an unit battery of the devices, and the devices may be selected from the group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage apparatus.

The structure and manufacturing method of the device are well known in the art to which the present disclosure pertains, and therefore a detailed description thereof will be omitted.

Although the exemplary embodiments of the present disclosure have been disclosed for illustrative purposes, those skilled in the art will appreciate that various application and modifications can be made, without departing from the scope and spirit of the invention as disclosed in the accompanying claims.

INDUSTRIAL APPLICABILITY

As described above, in the electrode current collector according to the present disclosure, as a resistive layer containing a volume expandable resin is disposed between two or more metal foils, not only the overall thickness of the metal foils is made thick to improve the output characteristics, but also when the temperature rises due to an abnormal condition, the volume expandable resin melts and expands to increase the resistance of the electrode current collector, thereby reducing the current flowing through the electrode current collector to exhibit the effect of improving cell safety.

The invention claimed is:

1. An electrode current collector for a lithium secondary battery, comprising: two or more metal foil layers; and a resistive layer positioned between the two or more metal foil layers,
    wherein the resistive layer includes a volume expandable resin, a conductive material, and an adhesive,
    the conductive material comprises at least one selected from the group consisting of carbon-based materials and metal materials, and
    at least one metal foil layer of the two or more metal foil layers has a concavo-convex portion including a convex portion and a concave portion on a surface of the at least one metal foil layer,
    the concavo-convex portion is formed only the surface facing to the resistive layer, and
    the resistive layer is formed in the concave portion.

2. The electrode current collector according to claim 1, wherein the resistive layer is interposed between two or more flat metal foil layers.

3. The electrode current collector according to claim 2, wherein the electrode current collector includes a lower current collector, a first resistive layer located on the lower current collector, an intermediate current collector located on the first resistive layer, a second resistive layer located on the intermediate current collector, and an upper current collector located on the second resistive layer.

4. The electrode current collector according to claim 1, wherein the convex portion and the concave portion have regular intervals.

5. The electrode current collector according to claim 1, wherein the volume expandable resin comprises at least one selected from the group consisting of polyethylene, polypropylene, and polyethylene vinyl acetate.

6. The electrode current collector according to claim 1, wherein the adhesive comprises at least one selected from the group consisting of polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene terpolymer (EPDM), a sulfonated EPDM, a styrene-butadiene rubber and a fluorine rubber.

7. The electrode current collector according to claim 1, wherein the volume expandable resin contained in the resistive layer blocks a current between two metal foil layers adjacent to each other when temperature of the electrode current collector rises due to non-ideal conditions.

8. The electrode current collector according to claim 1, wherein a thickness of the resistive layer is 5 to 50 μm.

9. The electrode current collector according to claim 1, wherein each layer of the two or more metal foil layers comprises the same metals.

10. The electrode current collector according to claim 1, wherein a thickness of each of the two or more metal foil layers is 10 to 100 μm.

11. The electrode current collector according to claim 1, wherein the two or more metal foil layers comprise Al metal, and the electrode current collector is a positive electrode current collector.

12. An electrode comprising an electrode mixture containing an electrode active material, a binder and a conductive material on at least one surface of the electrode current collector according to claim 1.

13. A lithium secondary battery comprising the electrode according to claim 12.

14. The electrode current collector according to claim 1, wherein an amount of the conductive material is 5 to 40% by weight based on a total weight of the resistive layer.

15. The electrode current collector according to claim 1, wherein an amount of the adhesive is 5 to 40% by weight based on a total weight of the resistive layer.

16. The electrode current collector according to claim 1, wherein an amount of the volume expandable resin is 20 to 50% by weight based on a total weight of the resistive layer.

17. The electrode current collector according to claim 1, wherein the resistive layer does not contain polyvinylpyrrolidone.

18. The electrode current collector according to claim 1, wherein the resistive layer is directly contact with two of the two or more metal foil layers.

* * * * *